(12) United States Patent
Lee et al.

(10) Patent No.: US 10,791,662 B2
(45) Date of Patent: Oct. 6, 2020

(54) TWIN SHAFT GARDENING SYSTEM

(71) Applicants: Kai S. Lee, Panama City Beach, FL (US); Esther W. Lee, Panama City Beach, FL (US)

(72) Inventors: Kai S. Lee, Panama City Beach, FL (US); Esther W. Lee, Panama City Beach, FL (US)

(*) Notice: Subject to any disclaimer, the term of this patent is extended or adjusted under 35 U.S.C. 154(b) by 182 days.

(21) Appl. No.: 15/982,439

(22) Filed: May 17, 2018

(65) Prior Publication Data

US 2018/0332758 A1 Nov. 22, 2018

Related U.S. Application Data

(60) Provisional application No. 62/603,135, filed on May 19, 2017, provisional application No. 62/603,508, filed on Jun. 5, 2017, provisional application No. 62/707,931, filed on Nov. 27, 2017.

(51) Int. Cl.
| | | |
|---|---|---|
| *A01B 33/02* | (2006.01) | |
| *A01B 33/08* | (2006.01) | |
| *A01B 33/12* | (2006.01) | |
| *A01B 33/10* | (2006.01) | |

(52) U.S. Cl.
CPC .......... *A01B 33/028* (2013.01); *A01B 33/082* (2013.01); *A01B 33/103* (2013.01); *A01B 33/12* (2013.01)

(58) Field of Classification Search
CPC ..... A01B 33/02; A01B 33/028; A01B 33/082; A01B 33/103

USPC ............... 172/42, 49, 108, 123, 520
See application file for complete search history.

(56) References Cited

U.S. PATENT DOCUMENTS

| | | | |
|---|---|---|---|
| D870,665 S | 11/1907 | Colgren | |
| 1,240,542 A | 9/1917 | Cassell | |
| 1,533,626 A | 4/1925 | Wilson et al. | |
| 1,641,393 A * | 9/1927 | Mackie | A01B 33/021 172/69 |
| 1,807,182 A * | 5/1931 | Stoner | A01B 1/243 172/21 |
| 2,513,186 A | 6/1950 | Leaman | |
| 2,612,094 A | 9/1952 | Drozinski | |
| 2,617,341 A * | 11/1952 | Clayton | A01B 33/16 172/43 |
| 3,397,748 A * | 8/1968 | Whiteside | A01B 49/04 172/548 |
| 3,455,398 A * | 7/1969 | Bowers | A01D 43/02 172/21 |
| 4,018,105 A | 4/1977 | Walker | |
| 4,202,414 A * | 5/1980 | vom Braucke | A01B 1/243 172/21 |
| 4,214,632 A * | 7/1980 | Brookshier | A01B 33/082 172/116 |
| 4,402,366 A | 9/1983 | Dankel | |
| 4,452,316 A | 6/1984 | Edwards | |
| 4,481,757 A | 11/1984 | Tsuchiya | |
| 4,483,400 A | 11/1984 | Arndt | |
| 4,519,459 A | 5/1985 | Reaume | |

(Continued)

*Primary Examiner* — Gary S Hartmann
(74) *Attorney, Agent, or Firm* — Price Heneveld LLP

(57) ABSTRACT

A gardening system includes a drive shaft operably coupled to first and second shafts for driving the first shaft in a first direction and the second shaft in a second direction. A first ground manipulation device is attached to the first shaft. A second ground manipulation device is attached to the second shaft.

14 Claims, 6 Drawing Sheets

(56) References Cited

U.S. PATENT DOCUMENTS

| | | |
|---|---|---|
| 4,620,599 A | 11/1986 | Zinck |
| 4,754,660 A | 7/1988 | Kobayashi et al. |
| 4,905,460 A | 3/1990 | Toman |
| 4,979,573 A | 12/1990 | Williamson |
| 5,048,617 A | 9/1991 | Haven |
| 5,101,911 A | 4/1992 | Lee et al. |
| 5,224,552 A | 7/1993 | Lee et al. |
| 5,353,881 A | 10/1994 | Lee et al. |
| 5,713,420 A * | 2/1998 | Roberts ............... A01B 33/028 172/42 |
| 6,488,101 B1 | 12/2002 | Miyahara et al. |
| 6,523,283 B2 * | 2/2003 | Sueshige ............... E01H 5/04 37/245 |
| 6,926,091 B2 | 8/2005 | Lee |
| 6,945,333 B1 * | 9/2005 | Drost ............... A01B 33/028 172/42 |
| 7,198,114 B2 | 4/2007 | Simon et al. |
| 7,878,260 B2 | 2/2011 | Notaras et al. |
| 8,047,938 B2 | 11/2011 | Sakai |
| 8,162,072 B2 | 4/2012 | Marcil et al. |
| 3,201,638 A1 | 6/2012 | Badger et al. |
| 3,434,563 A1 | 5/2013 | Gendelman et al. |
| 3,496,069 A1 | 7/2013 | Gendelman et al. |
| 8,607,889 B2 | 12/2013 | Marcil et al. |
| 8,627,897 B2 | 1/2014 | Marcil et al. |
| 9,167,737 B2 | 10/2015 | McGowen |
| 9,277,687 B2 | 3/2016 | Marcil et al. |
| 2003/0221399 A1 | 12/2003 | Hall |
| 2006/0011357 A1 | 1/2006 | Casey et al. |
| 2006/0070749 A1 | 4/2006 | Simon et al. |
| 2008/0202091 A1 | 8/2008 | Bundy |
| 2010/0326033 A1 | 12/2010 | Esmoris Bertoa |
| 2015/0271983 A1 | 10/2015 | Bos |
| 2017/0265372 A1 * | 9/2017 | Lee ............... A01B 33/028 |

\* cited by examiner

TWIN SHAFT GARDENING SYSTEM

CROSS-REFERENCE TO RELATED APPLICATION

This application claims priority to and the benefit under 35 U.S.C. § 119(e) of the U.S. Provisional Patent Application No. 62/603,135 filed May 19, 2017, entitled FAST PENETRATING TILLING TINES FOR THE COUNTER-ROTATING-TINE TILLER SHARK (US TRADEMARK 4342711); U.S. Provisional Patent Application No. 62/603,508 filed Jun. 5, 2017, entitled FAST PENETRATING TILLING TINES AND RELATED STRUCTURES FOR EFFICIENT TILLING; and U.S. Provisional Patent Application No. 62/707,931 filed Nov. 27, 2017, entitled THE TWIN-SHAFT, COUNTER-ROTATING TILLING TINE SYSTEM OF "TILLER SHARK" TO REPLACE THE SINGLE-SHAFT TILLING TINE SYSTEM OF CONVENTIONAL REAR TINE TILLERS, the entire disclosures of which is incorporated herein by reference.

FIELD OF THE DISCLOSURE

The present disclosure generally relates to power equipment. More specifically, the present disclosure relates to rototilling equipment.

BACKGROUND

Conventional rototillers used for tilling soil and cultivating in gardening or agricultural work characteristically have a single shaft with a plurality of tines affixed thereto. While conventional rotor tillers utilizing a single shaft may do an adequate job of tilling previously tilled soils or light soils, conventional tillers do not perform as well in hard soils, soils containing rocks and other debris, and/or soils containing a significant amount of dense, tall weeds therein. These hard soils, rocky soils, etc., require an increase in the downward force exerted on the tiller by the operator in order to cause the tines to enter the ground. Additionally, the conventional tiller will typically "walk" over these hard soils and skip areas, resulting in uneven tilling of the ground and/or tilling to a very shallow depth. Accordingly, it is therefore desired to implement a more robustly designed gardening system.

SUMMARY

According to a first aspect of the present disclosure, a gardening system includes a frame, a first shaft, and a second shaft. The first shaft is mounted within the frame for rotation in a first direction. The second shaft is mounted within the frame for rotation in a second direction, which is equal and opposite to the first direction. A drive system is operably coupled to the first and second shafts for driving the first shaft in the first direction and the second shaft in the second direction. A first ground manipulation device is attached to the first shaft. The first ground manipulation device includes a planar section that extends substantially perpendicular to the first shaft and an outer engaging edge that includes a plurality of irregularities. A second ground manipulation device is attached to the second shaft. The second ground manipulation device includes a planar section that extends substantially perpendicular to the second shaft and an outer engaging edge that includes a plurality of irregularities.

Embodiments of the first aspect of the present disclosure can include any one or a combination of the following features:

the drive system is operably coupled to a pair of wheels;
the pair of wheels rotate at a slower rate than the first and second shafts;
the first shaft, the second shaft, and the pair of wheels are all rotated by a common drive shaft;
the common drive shaft is provided with a plurality of worm drives that each include a worm and a worm gear;
the worms for the first and second shafts are angled in opposite directions to drive the first and second ground manipulation devices in opposite directions;
the worm for the pair of wheels is parallel to the angle of one of the worms of the first and second ground manipulation devices and opposite to the angle of the other of the worms of the first and second ground manipulation devices; and
the second ground manipulation device at least partially overlaps with the first ground manipulation device in at least one of a vertical plane and a horizontal plane.

According to a second aspect of the present disclosure, a gardening system includes a drive system operably coupled to first and second shafts for driving the first shaft in a first direction and the second shaft in a second direction. A first ground manipulation device is attached to the first shaft. A second ground manipulation device is attached to the second shaft. The second ground manipulation device at least partially overlaps with the first ground manipulation device in at least one of a vertical plane and a horizontal plane.

Embodiments of the second aspect of the present disclosure can include any one or a combination of the following features:

the drive system is operably coupled to a pair of wheels;
the pair of wheels rotate at a slower rate than the first and second shafts;
the first shaft, the second shaft, and the pair of wheels are all rotated by a common drive shaft;
the common drive shaft is provided with a plurality of worm drives that each include a worm and a worm gear;
the worms for the first and second shafts are angled in opposite directions to drive the first and second ground manipulation devices in opposite directions;
the worm for the pair of wheels is parallel to the angle of one of the worms of the first and second ground manipulation devices and opposite to the angle of the other of the worms of the first and second ground manipulation devices; and
the second ground manipulation device at least partially overlaps with the first ground manipulation device in at least one of a vertical plane and a horizontal plane.

According to a third aspect of the present disclosure, a gardening system includes a drive shaft operably coupled to first and second shafts for driving the first shaft in a first direction and the second shaft in a second direction. A first ground manipulation device is attached to the first shaft. A second ground manipulation device is attached to the second shaft. The first and second ground manipulation devices overlap with one another in a vertical plane and a horizontal plane.

Embodiments of the third aspect of the present disclosure can include any one or a combination of the following features:

the drive system is operably coupled to a pair of wheels that rotate at a slower rate than the first and second shafts;
the first shaft, the second shaft, and the pair of wheels are all rotated by a common drive shaft; and the common drive shaft is provided with a plurality of worm drives that each include a worm and a worm gear, wherein the worms for the first and second shafts are angled in opposite directions to drive the first and second ground manipulation devices in opposite directions, and wherein the worm for the pair of wheels is parallel to the angle of one of the worms of the first and second ground manipulation devices and opposite to the angle of the other of the worms of the first and second ground manipulation devices.

These and other aspects, objects, and features of the present disclosure will be understood and appreciated by those skilled in the art upon studying the following specification, claims, and appended drawings.

DETAILED DESCRIPTION

Figure 1:
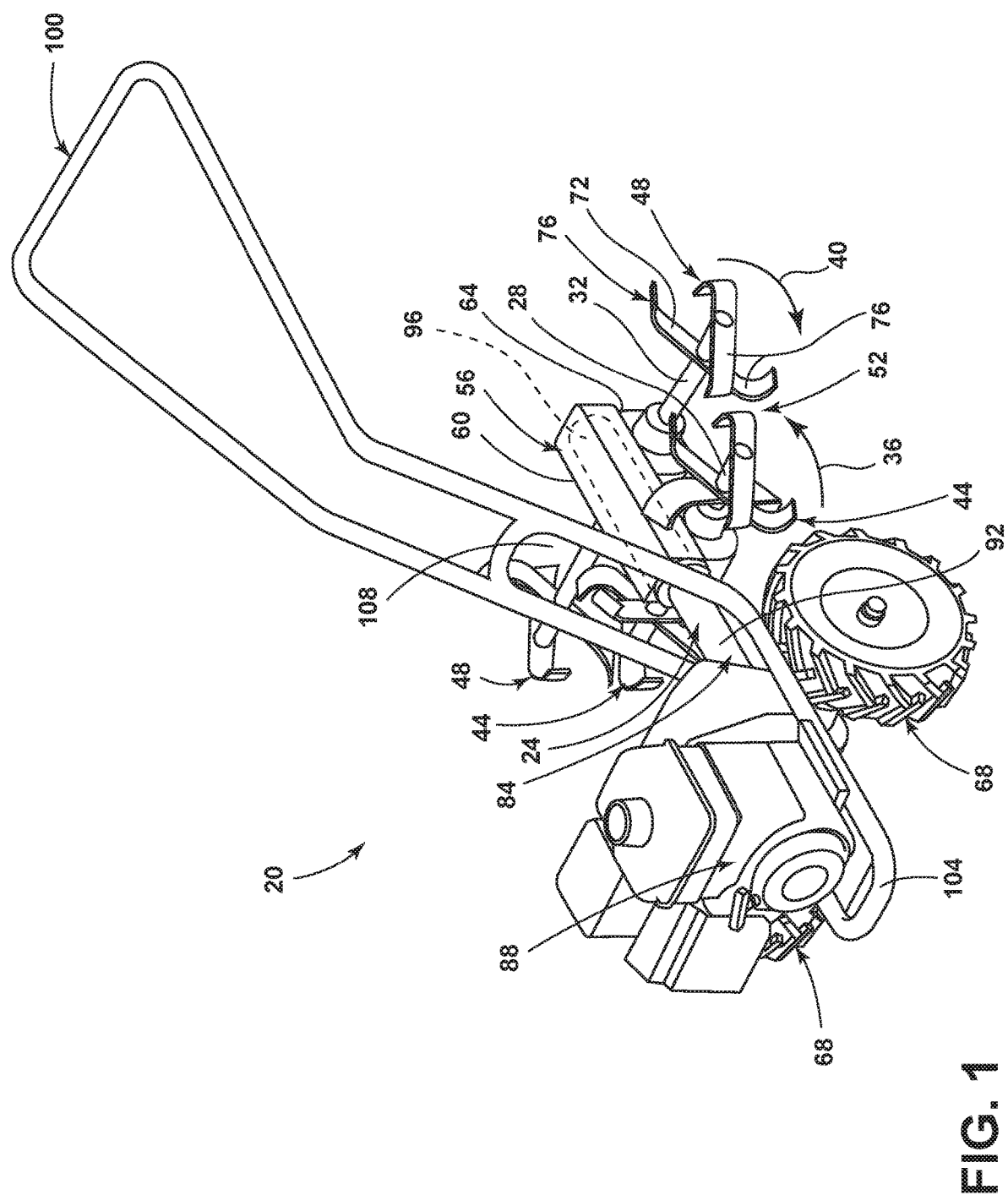
FIG. 1 is a side perspective view of a gardening system having an engine, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to tilling equipment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the" "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, a gardening system 20 includes a drive shaft 24 operably coupled to first and second shafts 28, 32 for driving the first shaft 28 in a first direction 36 and the second shaft 32 in a second direction 40. A first ground manipulation device 44 is attached to the first shaft 28. A second ground manipulation device 48 is attached to the second shaft 32.

Referring again to FIGS. 1 and 2, the gardening system 20 includes a working assembly 52 supported by a transmission box or frame 56. The first shaft 28 is mounted within the frame 56 for rotation in the first direction 36. The second shaft 32 is mounted within the frame 56 for rotation in the second direction 40. The second direction 40 of rotation is opposite to the first direction 36 of rotation. The first shaft 28 and the second shaft 32 are mounted transversely through sidewalls 60 and 64 of the frame 56 and are substantially perpendicular to the normal direction of travel during operation of the gardening system 20. The frame 56 is supported above the ground by a pair of wheels 68. The working assembly 52 further includes the first and second ground manipulation devices 44, 48 removably attached to the first shaft 28 and the second shaft 32, respectively. Each of the ground manipulation devices 44, 48 has a planar section 72 that extends substantially perpendicular to the first and second shafts 28, 32 and an outer engaging edge 76 that includes a plurality of protrusions or irregularities 80 spaced there along. Each ground manipulation device 44, 48 is removably fixed to its respective shaft 28, 32 by any method known in the art, such as through the usage of fasteners. Moreover, it will be appreciated that the ground manipulation devices 44, 48 may take any shape and may be used for any function, including but not limited to, tilling, shearing, and/or cutting, without departing from the scope of the present disclosure.

Figure 2:
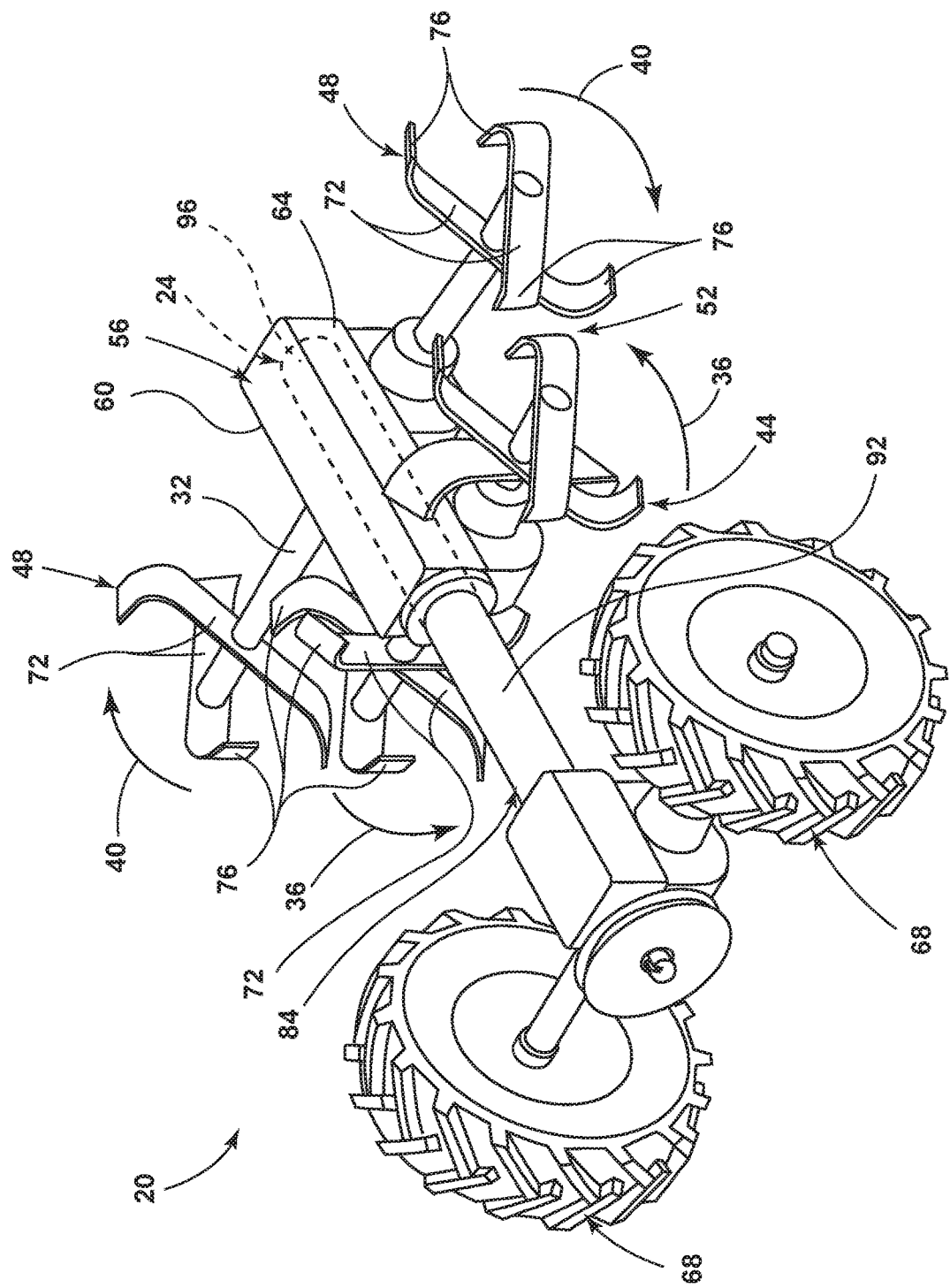
FIG. 2 is a side perspective view of the gardening system with the engine and a handle removed, according to one example.

Referring further to FIGS. 1 and 2, the gardening system 20 includes a drive system 84 that is operably coupled with an engine 88, the first shaft 28, the second shaft 32, and/or a device (e.g., a gear or pulley system) for rotating the first and/or second shafts 28, 32. For example, the drive shaft 24 may be disposed within the drive system 84 and include a first portion 92 and a second portion 96. The first portion 92 of the drive shaft 24 is coupled to the engine 88. The first portion 92 may operably couple to the pair of wheels 68. Accordingly, the pair of wheels 68 is operably coupled to the drive system 84. The second portion 96 of the drive shaft 24 may be disposed, at least partially, within the frame 56 and may operably couple with the first and second shafts 28, 32.

Referring still further to FIGS. 1 and 2, the gardening system 20 includes a handle 100 extending rearwardly of the engine 88. The handle 100 may additionally form an engine support or engine cradle 104 that supports the engine 88. The drive shaft 24 may pass through the handle 100 to engage with the first shaft 28 and the second shaft 32. For example, the handle 100 may define a drive shaft aperture 108. Because of the unique counter-rotational ground manipulation devices 44, 48, the handle may perform at least four functions that normally require complex transmissions, including stationary tilling, self-propelled forward or backward tilling, and control of the tilling depth and the speed of machine travel. The at least four functions can be readily obtained by simply adjusting the height of the handle 100 with respect to the ground. Stationary tilling may be accomplished when the machine is leveled with respect to the ground by leveling the handle 100. If the rear end of the machine is lowered by placing a downward force upon the handle 100, the first and second ground manipulation devices 44, 48 may till to a greater depth into the ground and/or may till into ground that is more firm. Likewise, if the rear end of the machine is tilted upwards by placing an upward pressure on the handle 100, the weight of machine is shifted forward and the first and second ground manipulation devices 44, 48 may be raised to a more shallow depth by a pivoting about a pivot axis defined by the pair of wheels 68.

Referring yet again to FIGS. 1 and 2, in some examples, the gardening system 20 may be provided with a support member or leg that is biased to a retracted position by a retraction-biasing member (e.g., spring or cable). When in the retracted position, the support member may elevate the first and second ground manipulation devices 44, 48 by elevating the rear end of the gardening system 20. The support member is pivotably coupled to the gardening system 20 at a suitable location, such as to the frame 46, to a rearward portion of a user shield that protects the user from the rotating first and second ground manipulation devices 44, 48, or any other suitable location. In such examples that utilize the support member, downward pressure applied to the handle 100 overcomes the biasing force of the retraction-biasing member to move the support member into a partially extended or extended position and plunge the first and second ground manipulation devices 44, 48 at least partially into the ground. Upward pressure on the handle 100 may decrease the depth of tilling and/or permit the retraction-biasing member to retract the support member to elevate the first and second ground manipulation devices 44, 48. The support member may be utilized in a manner similar to a bicycle kickstand by preventing unintentional movement of the gardening system 20 while the gardening system 20 is in use. Additionally, the support member may prevent damage to the first and second ground manipulation devices 44, 48 caused by the weight of the gardening system 20 when the gardening system 20 is stored and not in use.

Figure 3:
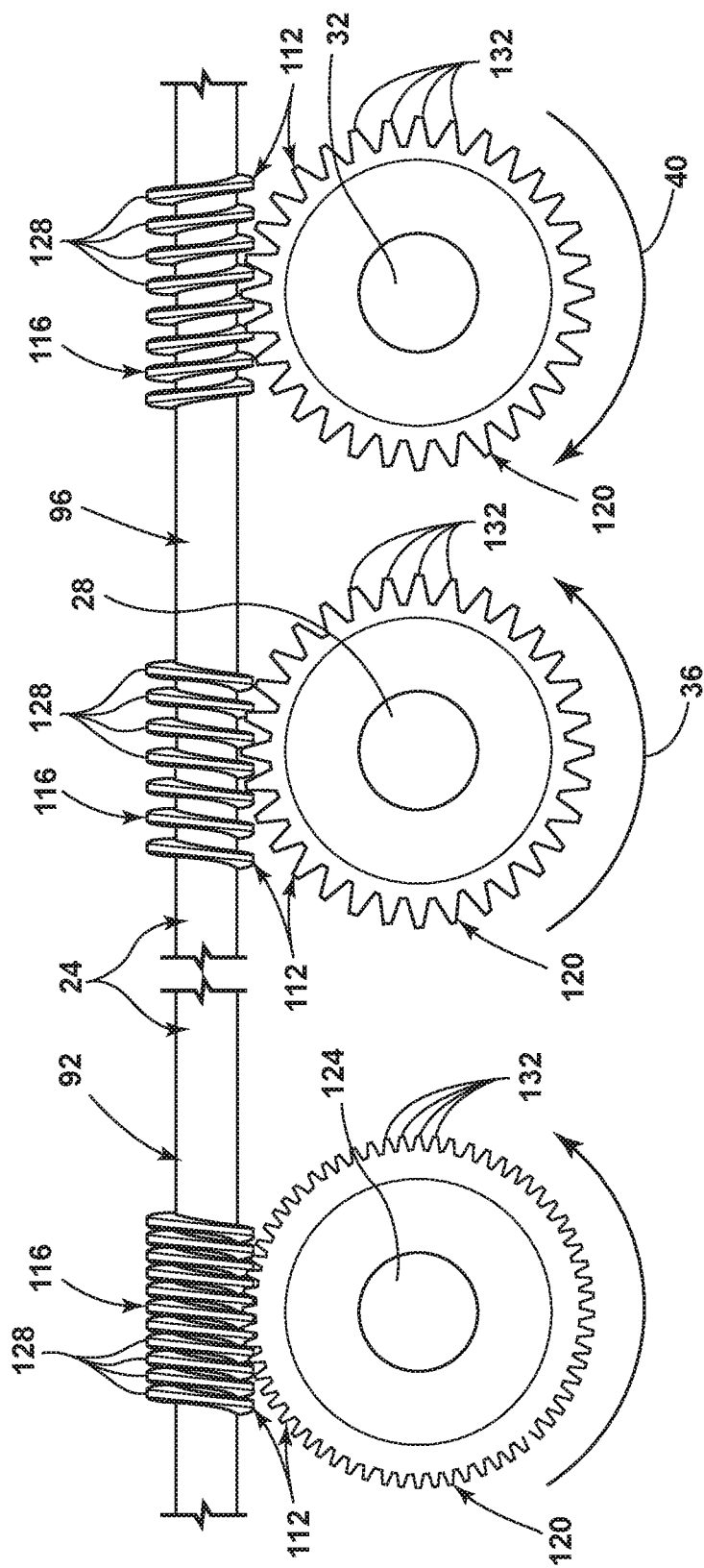
FIG. 3 is a side view of a drive system having a plurality of worm drives, according to one example.

Referring now to FIG. 3, the drive shaft 24 is provided with a plurality of worm drives 112. The worm drives 112 each include a worm 116 and a worm gear 120. The first and second shafts 28, 32 are coupled to a central portion of the worm gears 120 that are associated therewith. The pair of wheels 68 are coupled to one another by an axle 124. The axle 124 is coupled to the worm gear 120 that is associated with the pair of wheels 68. The worm gears 120 engage with the worms 116 that are provided on the drive shaft 24. Accordingly, when the engine 88 induces rotation of the drive shaft 24, the worms 116 drive the worm gears 120. The rotation imparted to the worm gears 120 by the worms 116 is in turn transmitted to the first shaft 28, the second shaft 32, and the axle 124. It is in this manner that the first shaft 28, the second shaft 32, and the pair of wheels 68 are driven by a common drive shaft 24. The worm drives 112 may be configured to provide differing gearing ratios to the worm gears 120 to effect differing rates of rotation of the worm gears 120. For example, the worm drives 112 that are associated with the first and second shafts 28, 32 may be configured to rotate the first and second shafts 28, 32 at an equal-but opposite number of revolutions per minute (RPM) while the worm drive 112 that is associated with the pair of wheels 68 is configured to rotate the pair of wheels 68 at an RPM that is less than the RPM of the first and second shafts 28, 32. Accordingly, the first and second ground manipulation devices 44, 48 may be rotated at a relatively high RPM by the first and second shafts 28, 32, respectively, while the pair of wheels 68 are rotated by the axle 124 at a lower RPM such that the first and second ground manipulation devices 44, 48 can till the ground rapidly and effectively as the pair of wheels 68 advance the gardening system 20 at a slower, more controlled rate. In some examples, the first and second shafts 28, 32 may be configured to rotate at speeds that differ from one another. For example, in wet and/or sticky soil, the forward rotating ground manipulation devices (e.g., the first ground manipulation devices 44) can rotate at a faster rate (i.e., greater RPM) than the rotation rate of the opposing, rearward rotating ground manipulation devices (e.g., the second ground manipulation devices 48), thereby providing additional forward force to aid the pair of wheels 68 in advancing the gardening system 20 while also canceling the rearward force exerted by the opposing, rearward rotating ground manipulation devices.

Referring again to FIG. 3, the first and second shafts 28, 32 are rotated at equal speeds in opposing directions. The equal-and-opposite rotation of the first and second shafts 28, 32 is provided by the worms 116 that are associated with the first and second shafts 28, 32 having equal spacing between individual worm teeth 128 and by providing one of the worms 116 that are associated with the first and second shafts 28, 32 with a right hand worm and the other one of the worms 116 that are associated with the first and second shafts 28, 32 with a left hand worm. Similarly, the spacing between individual gear teeth 132 on the worm gears 120 that are associated with the first and second shafts 28, 32 are spaced equally apart on the respective worm gears 120. Accordingly, rotation of the drive shaft 24 effects equal-and-opposite rotation of the worm gears 120, which in turn imparts equal-and-opposite rotation of the first and second shafts 28, 32 that drive the first and second ground manipulation devices 44, 48, respectively. The right hand worm and the left hand worm differ in the directionality of an angle of inclination or the worm teeth 128 relative to the drive shaft 24. Therefore, the worms 116 for the first and second shafts 28, 32 are angled in opposite directions to drive the first and second ground manipulation devices 44, 48 in opposite directions. The worm 116 for the pair of wheels 68 is parallel to the angle of inclination of one of the worms 116 of the first and second ground manipulation devices 44, 48 and opposite to the angle of inclination of the other of the worms 116 of the first and second ground manipulation devices 44, 48. Said another way, the worm 116 for the pair of wheels 68 may be a left hand worm or a right hand worm. As depicted in FIG. 3, the worm 116 for the pair of wheels 68 is a left hand worm, the worm 116 for the first shaft 28 is a left hand worm, and the worm 116 for the second shaft 28 is a right hand worm. Additionally, the spacing between the individual worm teeth 128 on the worm 116 for the pair of wheels 68 is less than the spacing between the individual worm teeth 128 for the first and second shafts 28, 32. Similarly, the spacing between the individual gear teeth 132 of the worm gear 120 for the pair of wheels 68 is less than the spacing between the individual gear teeth 132 of the worm gears 120 for the first and second shafts 28, 32. Accordingly, the pair of wheels 68 are rotated at lower RPM than the RPM for the first and second shafts 28, 32. In various examples, the counter-rotating first and second ground manipulation devices 44, 48 do not add any load to the pair of wheels 68 as a result of the interaction between the first and second ground manipulation devices 44, 48 and the ground.

Figure 4:
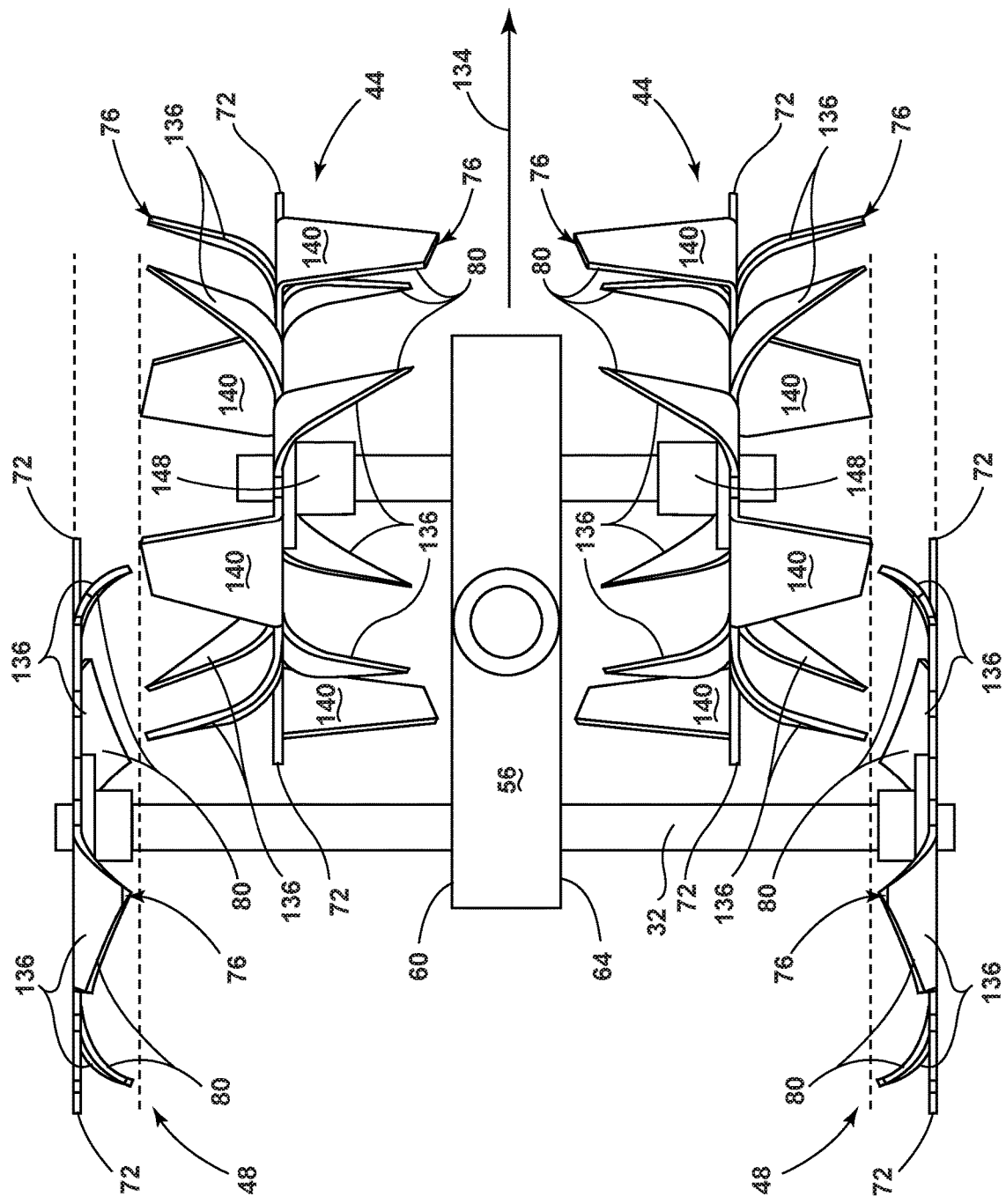
FIG. 4 is a top view of a configuration of first and second ground manipulation devices, according to one example.

Referring to FIG. 4, the first and second ground manipulation devices 44, 48 are shown coupled to the first and second shafts 28, 32, respectively. The first and second shafts 28, 32 extend perpendicularly through the sidewalls 60, 64 of the frame 56. The first and second shafts 28, 32 are substantially parallel to one another. A direction of travel of the gardening system 20 is indicated by arrow 134. The first and second ground manipulation devices 44, 48 are removably attached to the first shaft 28 and the second shaft 32, respectively. The first and second ground manipulating devices 44, 48 each include the planar section 72 that extends substantially perpendicular to the first and second shafts 28, 32, and the outer engaging edge 76. The outer engaging edge 76 includes the plurality of irregularities 80 spaced there along. Each of the first and second ground manipulation devices 44, 48 is removably fixed to its respective shaft 28, 32 by any method known in the art, such as through the usage of fasteners. The irregularities 80 include a plurality of saw-blade-like teeth 136 that are bent alternately to both sides of the planar section 72 for the first ground manipulating devices 44. Interspersed between the bent saw-blade-like teeth 136 on the first ground manipulating devices 44 are digging arms 140 that extend laterally beyond the alternating saw-blade-like teeth 136. The second ground manipulation devices 48 alternate between the planar section 72 and the saw-blade-like teeth 136. However, rather than extending to either side of the planar section 72 as in the first ground manipulating device 44, the saw-blade-like teeth 136 on the second ground manipulation devices 48 may extend to one side of the planar section 72, such as inwardly toward the first ground manipulating devices 44. Accordingly, the second ground manipulating devices 48 may provide better line definition between tilled and untilled ground. Additionally, by bending the saw-blade-like teeth 136 only inward of the planar section 72, it is possible for the gardening system 20 to be utilized in closer proximity to areas that are untillable or not desired to be tilled (e.g., lawn, buildings, etc.).

Figure 5:
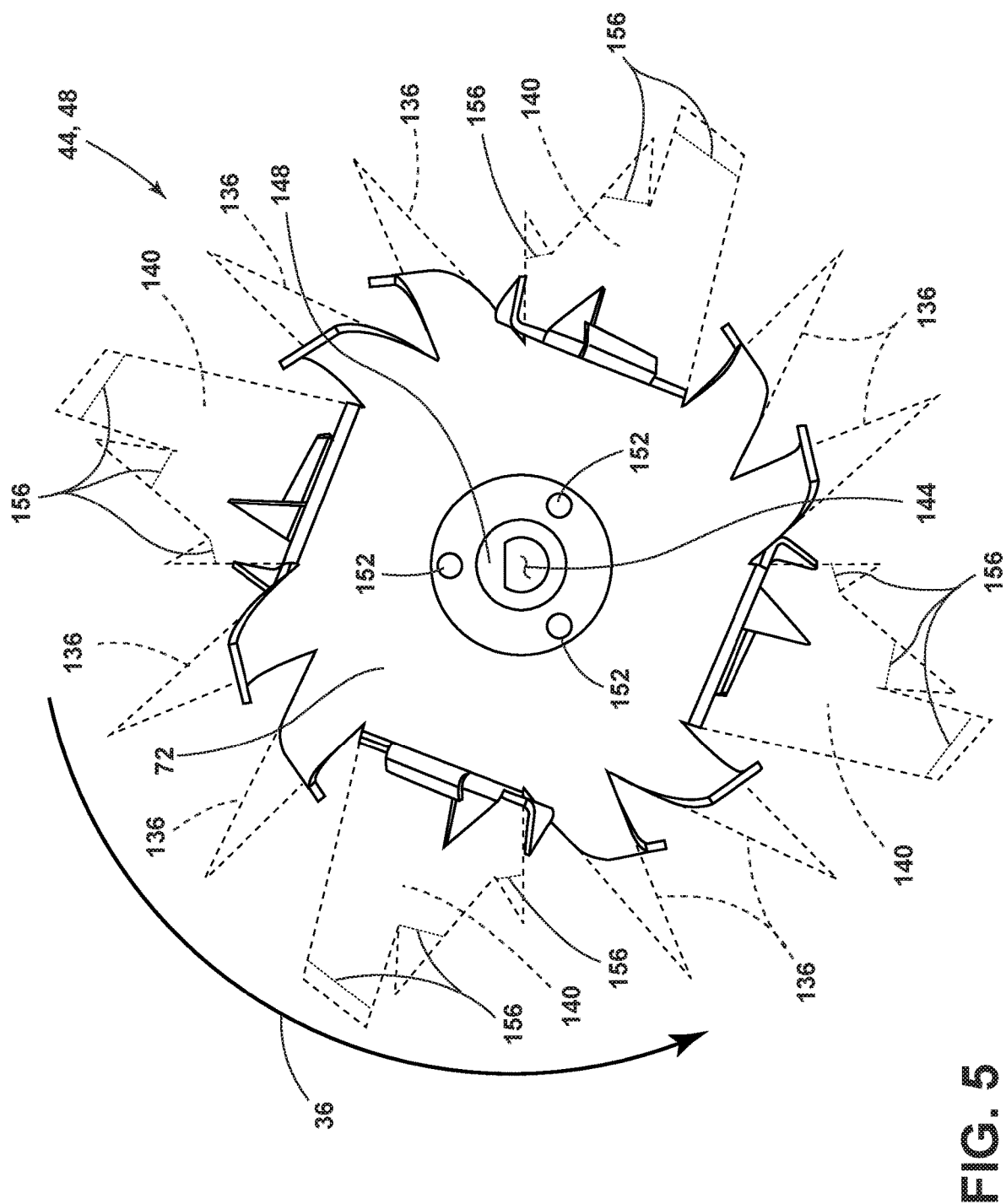
FIG. 5 is a side perspective view of one of the ground manipulation devices, illustrating saw-blade-like teeth and digging arms, according to one example.
Figure 6:
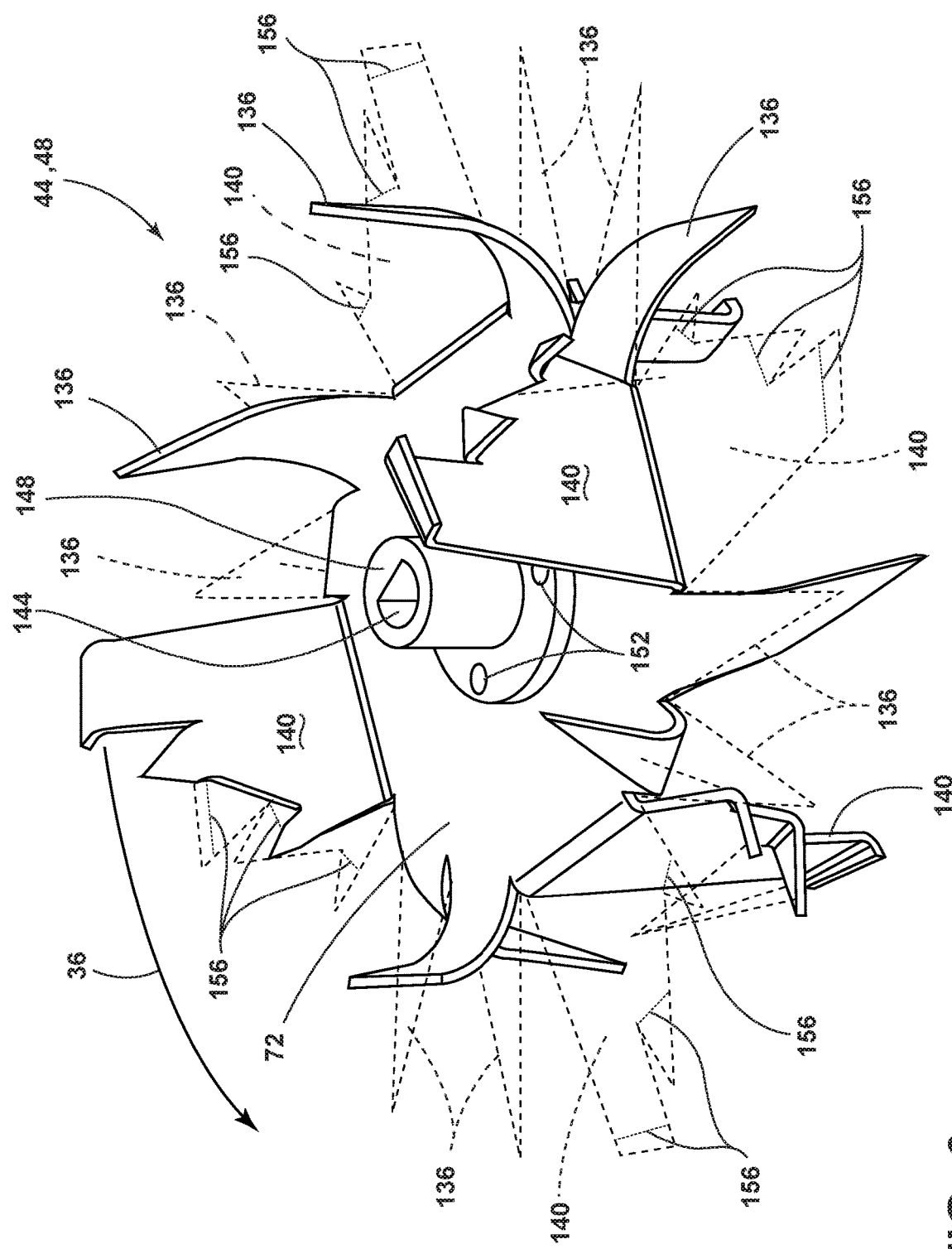
FIG. 6 is a side perspective view of one of the ground manipulation devices, illustrating the saw-blade-like teeth and digging arms, according to one example

Referring now to FIGS. 4-6, the planar section 72 defines a center hole 144 and a hub 148. The first and second shafts 28, 32 are disposed through the center hole 144 and the hub 148. The ground manipulation devices 44, 48 are attached to the hubs 148 through one or more fasteners 152 that are disposed within fastener holes defined by the planar section 72 of the ground manipulation devices 44, 48. Therefore, as the first and second shafts 28, 32 rotate, the saw-blade-like teeth 136 slice into the ground and the digging arms 140 penetrate and widen further into the ground. The ground manipulation devices 44, 48 are removably fixed on the shafts 28, 32 and the length of the shafts 28, 32 can vary so as to provide the maximal ground coverage in a single pass of the gardening system. For example, as shown in FIG. 4, the ground manipulation devices 44, 48 can be spaced apart with the first ground manipulation device 44 on the first shaft 28 closer to the frame 56 than the second ground manipulation device 48 on the second shaft 32. Alternatively, the ground manipulation devices 44, 48 can be spaced apart with the second ground manipulation device 48 on the second shaft 32 closer to the frame 56 than the first ground manipulation device 44 on the first shaft 28. Therefore, in either configuration, there is lateral overlapping between the first and second ground manipulation devices 44, 48 on either side of the frame 56. The overlapping helps to reduce the total length and/or width of the gardening system 20, making the gardening system 20 more maneuverable in tight corners. Lateral overlapping also helps avoid and clear debris jams that may occur between the first and second ground manipulation devices 44, 48 as well as between the first and second ground manipulation devices 44, 48 and the frame 56. In some examples, the first and second shafts 28, 32 may be extendable such that a distance between the sidewalls 60, 64 of the frame 56 and the first and second ground manipulation devices 44, 48 may be adjusted. Equal and adequate spacing is provided between the first and second ground manipulation devices 44, 48 with enough space between components of the gardening system 20 that binding and/or physical interference is avoided. The first and second ground manipulation devices 44, 48 may at least partially overlap in at least one of a vertical plane and a horizontal plane.

Referring to FIGS. 5 and 6, an example of one of the ground manipulation devices 44, 48 is shown in solid lines. The ground manipulation device 44, 48 is also depicted in dashed lines that indicate the shape of the ground manipulation device 44, 48 prior to the bending of the saw-blade-like teeth 136 and the digging arms 140. Said another way, the dashed lines indicate a two-dimensional version of the ground manipulation device 44, 48 that is a precursor to the finished product shown in solid lines. Double-dashed lines 156 indicate some of the seams at which the saw-blade-like teeth 136 and digging arms 140 are bent along to provide the final shape of the ground manipulation device 44, 48.

The gardening system 20 of the present disclosure provides first and second shafts 28, 32 that carry first and second ground manipulation devices 44, 48, respectively. The first and second shafts 28, 32 rotate at equal speeds and in opposing rotational directions. Accordingly, the net force on the gardening system 20 in the direction of travel that is exerted by the rotation of the first and second shafts 28, 32 is negligible, eliminated, and/or neutralized. Therefore, operation of the gardening system 20 of the present disclosure is made more controllable and safer. Additionally, the user may utilize the gardening system 20 with a lesser degree of physical exertion than required for conventional tilling equipment. Further, wear and tear on the drive system 84 of the gardening system is decreased as the pair of wheels 68 are not being affected by the operation of the first and second ground manipulation devices 44, 48.

Conventional tilling equipment utilizes a single shaft to rotate tines and till the ground. When the tines of conventional tilling equipment are rotating in the same direction as the wheels of the tilling equipment, then the tines have a tendency to lurch forward or skip across the ground when harder soil, ground cover, or obstructions are encountered. When the tines of conventional tilling equipment are rotating in a direction that is opposite to the direction of rotation of the wheels of the tilling equipment, then the tines have a tendency to cause the wheels to slip and generally fight the advancement of the wheels. Either configuration of the conventional tilling equipment results in a less controllable, more fatiguing piece of equipment to operate while also generating more wear and tear on the tilling equipment, which reduces the lifetime and perceived quality of the tilling equipment. Accordingly, the gardening system 20 of the present disclosure solves these issues and provides the user with a greater and safer user experience. Additionally, the counter-rotation of the first and second shafts 28, 32 results in the first and second ground manipulation devices 44, 48 digging into the ground from opposite directions such that the first and second ground manipulation devices 44, 48 bite into the ground in a very efficient manner. By contrast, the conventional tilling equipment provide a single shaft that results in the tines rotating in a single direction that only scratches the ground, thereby tilling the ground much less efficiently and to a lesser depth with equivalent exertion by the user.

To work, the machine can be coupled to the engine 88 or a power source. For example, a large version of this machine can be driven by the engine 88 of a lawn or garden tractor. Still larger versions with extended shafts 28, 32 and a multiple number of the ground manipulation devices 44, 48 and/or other working devices 44, 48 can be driven by a farm tractor or an engine 88 of equivalent power for tilling fields. Conversely, a small version of the machine can be driven by a small handheld engine 88 or power source.

A variety of advantages may be derived from the use of the present disclosure. For example, use of the gardening system 20 disclosed herein provides a unique machine capable of moving hard dirt and/or heavy weeds simultaneously. Additionally, the unique ground manipulation devices provided herein may perform various functions simultaneously to reduce the time needed to alter a ground surface upon which the gardening system 20 is used.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:
1. A gardening system, comprising:
a frame;
a first shaft mounted within the frame for rotation in a first direction;

a second shaft mounted within the frame for rotation in a second direction, which is opposite to the first direction;

a pair of wheels that rotate at a slower rate than the first shaft and the second shaft;

a drive system comprising a drive shaft, wherein the drive shaft is operably coupled to the first shaft, the second shaft, and the pair of wheels, wherein rotation of the drive shaft induces rotation of the first shaft, the second shaft, and the pair of wheels;

a first ground manipulation device attached to the first shaft, the first ground manipulation device having a planar section extending substantially perpendicular to the first shaft and an outer engaging edge having a plurality of irregularities; and a second ground manipulation device attached to the second shaft, the second ground manipulation device having a planar section extending substantially perpendicular to the second shaft and an outer engaging edge having a plurality of irregularities.

2. The gardening system of claim 1, wherein the drive shaft is provided with a plurality of worm drives that each comprise a worm and a worm gear.

3. The gardening system of claim 2, wherein the worms for the first and second shafts are angled in opposite directions to drive the first and second ground manipulation devices in opposite directions.

4. The gardening system of claim 3, wherein the worm for the pair of wheels is parallel to the angle of the worm of the first shaft or the worm of the second shaft.

5. The gardening system of claim 1, wherein the second ground manipulation device at least partially overlaps with the first ground manipulation device in at least one of a vertical plane and a horizontal plane.

6. A gardening system, comprising:

a drive system comprising a drive shaft, wherein the drive shaft is provided with a first worm drive, a second worm drive, and a third worm drive, wherein the first worm drive operably couples with a first shaft to drive the first shaft in a first direction, the second worm drive operably couples with a second shaft to drive the second shaft in a second direction, and the third worm drive operably couples with a pair of wheels to drive the pair of wheels in one of the first direction or the second direction, and wherein the first direction and the second direction are opposite to one another;

a first ground manipulation device attached to the first shaft; and a second ground manipulation device attached to the second shaft, wherein the second ground manipulation device at least partially overlaps with the first ground manipulation device in at least one of a vertical plane and a horizontal plane.

7. The gardening system of claim 6, wherein the pair of wheels rotate at a slower rate than the first and second shafts.

8. The gardening system of claim 6, wherein the first worm drive comprises a first worm and a first worm gear, the second worm drive comprises a second worm and a second worm gear, and the third worm drive comprises a third worm and a third worm gear.

9. The gardening system of claim 8, wherein the first worm and the second worm are angled in opposite directions to drive the first and second ground manipulation devices in opposite directions.

10. The gardening system of claim 9, wherein the third worm associated with the pair of wheels is parallel to the angle of one of the first worm or the second worm and opposite to the angle of the other of the first worm or the second worm.

11. The gardening system of claim 6, wherein the second ground manipulation device at least partially overlaps with the first ground manipulation device in each of the vertical plane and the horizontal plane.

12. A gardening system, comprising:

a drive shaft operably coupled to a first shaft, a second shaft, and a pair of wheels such that the drive shaft is common to the first shaft, the second shaft, and the pair of wheels, wherein rotation of the drive shaft simultaneously rotates the first shaft in a first direction, the second shaft in a second direction, and the pair of wheels in one of the first direction or the second direction, and wherein the first direction and the second direction oppose one another;

a first ground manipulation device attached to the first shaft; and a second ground manipulation device attached to the second shaft, wherein the first and second ground manipulation devices overlap with one another in a vertical plane and a horizontal plane.

13. The gardening system of claim 12, wherein the pair of wheels rotate at a slower rate than the first and second shafts.

14. The gardening system of claim 12, wherein the common drive shaft is provided with a plurality of worm drives that each comprise a worm and a worm gear, wherein the worms for the first and second shafts are angled in opposite directions to drive the first and second ground manipulation devices in opposite directions, and wherein the worm for the pair of wheels is parallel to the angle of one of the worms of the first and second ground manipulation devices and opposite to the angle of the other of the worms of the first and second ground manipulation devices.

* * * * *